US009815638B2

(12) United States Patent
Piret et al.

(10) Patent No.: US 9,815,638 B2
(45) Date of Patent: Nov. 14, 2017

(54) UNLOADING DEVICE, UNLOADING PROCESS AND UNLOADED POWDER

(75) Inventors: Fabien Piret, Hamme-Mille (BE); Kris Lejeune, Wijgmaal (BE); Hans Andersen, Vejen (DK)

(73) Assignee: Solvay SA, Brussels (BE)

( * ) Notice: Subject to any disclaimer, the term of this patent is extended or adjusted under 35 U.S.C. 154(b) by 599 days.

(21) Appl. No.: 14/233,001

(22) PCT Filed: Jul. 20, 2012

(86) PCT No.: PCT/EP2012/064287
§ 371 (c)(1),
(2), (4) Date: Feb. 5, 2014

(87) PCT Pub. No.: WO2013/014075
PCT Pub. Date: Jan. 31, 2013

(65) Prior Publication Data
US 2014/0178134 A1 Jun. 26, 2014

(30) Foreign Application Priority Data

Jul. 22, 2011 (EP) ..................................... 11175077

(51) Int. Cl.
*B65G 53/48* (2006.01)
*B65G 53/50* (2006.01)
*B60P 1/42* (2006.01)

(52) U.S. Cl.
CPC ................ *B65G 53/48* (2013.01); *B60P 1/42* (2013.01); *B65G 53/50* (2013.01)

(58) Field of Classification Search
CPC .... B65G 53/48; B60P 1/40; B60P 1/42; B01F 7/0025; B01F 7/00391; B01F 13/004; B01F 15/0251; B01F 2015/0204; B01F 7/088
See application file for complete search history.

(56) References Cited

U.S. PATENT DOCUMENTS

| | | | | |
|---|---|---|---|---|
| 3,129,927 A | * | 4/1964 | Mast | A01K 5/0216 366/157.2 |
| 3,599,939 A | * | 8/1971 | O'Brien | B01F 13/0035 366/321 |
| 3,797,807 A | * | 3/1974 | Behrens | A01K 5/002 366/186 |
| 3,804,377 A | * | 4/1974 | Kugle | B01F 7/00925 241/101.74 |

(Continued)

FOREIGN PATENT DOCUMENTS

CN 1533461 A 9/2004
DE 19717732 C1 10/1998
(Continued)

*Primary Examiner* — Tony G Soohoo
(74) *Attorney, Agent, or Firm* — Beatrice C. Ortego

(57) ABSTRACT

Device for unloading a powder from standardized bulk containers equipped with an inner liner, the device comprising a collection unit suitable for being tightly fixed on the container and suitable for being in fluid communication with the interior of the liner; a shearing unit, in fluid communication with the collection unit, comprising shearing means for shearing the powder; and a separate delivering unit, in down stream fluid communication with the shearing unit, the delivering unit comprising an output suitable for connecting pneumatic unloading means.

20 Claims, 4 Drawing Sheets

(56) References Cited

U.S. PATENT DOCUMENTS

| | | | | |
|---|---|---|---|---|
| 3,901,483 A * | 8/1975 | Lasar | ............... | A22C 5/00 |
| | | | | 366/193 |
| 3,995,836 A * | 12/1976 | Carter | ............... | A01K 5/002 |
| | | | | 366/192 |
| 4,268,205 A * | 5/1981 | Vacca | ............... | B65G 53/4633 |
| | | | | 222/368 |
| 4,363,571 A * | 12/1982 | Jackson | ............... | B65G 53/48 |
| | | | | 198/601 |
| 4,455,111 A * | 6/1984 | Jackson | ............... | B65G 53/08 |
| | | | | 198/601 |
| 4,875,811 A | 10/1989 | Merrett et al. | | |
| 5,096,336 A | 3/1992 | Merrett et al. | | |
| 5,352,035 A * | 10/1994 | Macaulay | ............... | B01F 7/087 |
| | | | | 366/15 |
| 5,378,047 A * | 1/1995 | Merrett | ............... | B60P 1/60 |
| | | | | 298/17 R |
| 5,622,323 A * | 4/1997 | Krueger | ............... | A01K 5/002 |
| | | | | 241/101.76 |
| 5,803,673 A * | 9/1998 | Reinsch | ............... | B65D 88/30 |
| | | | | 406/106 |
| 5,931,393 A * | 8/1999 | Alsip | ............... | E01C 19/205 |
| | | | | 239/654 |
| 5,988,436 A | 11/1999 | Kohlen et al. | | |
| 6,409,274 B1 * | 6/2002 | Merrett | ............... | B60P 3/2245 |
| | | | | 220/1.6 |
| 9,194,092 B2 * | 11/2015 | Kline | ............... | B01F 3/1221 |
| 2014/0178134 A1 * | 6/2014 | Piret | ............... | B65G 53/48 |
| | | | | 406/53 |
| 2015/0375186 A1 * | 12/2015 | O'Callaghan | ............... | B01F 3/12 |
| | | | | 366/137 |

FOREIGN PATENT DOCUMENTS

| | | |
|---|---|---|
| FR | 2911588 A1 | 1/2001 |
| JP | 61012446 A | 1/1986 |
| JP | 2000-211747 A | 8/2000 |
| JP | 2010-154817 A | 7/2010 |
| WO | WO 03/008710 A1 | 1/2003 |
| WO | 2009130271 A1 | 10/2009 |

* cited by examiner

UNLOADING DEVICE, UNLOADING PROCESS AND UNLOADED POWDER

CROSS-REFERENCE TO RELATED APPLICATION

This application is a U.S. national stage entry under 35 U.S.C. §371 of International Application No. PCT/EP2012/064287 filed Jul. 20, 2012, which claims priority to European application No. 11175077.4, filed Jul. 22 2011, whose whole content is incorporated herein by reference for all purposes.

TECHNICAL FIELD

The invention concerns a device for unloading powders from bulk containers and a process for unloading powders. The invention concerns as well the unloaded powders.

BACKGROUND

The use of standardized bulk containers, for example standardized sea bulk containers, to transport bulk solids is widely accepted. To preserve the cleanliness of the solids or to avoid leakages, the bulk containers are generally equipped with inner liners in which the solids to be transported are stored. This system, commonly referred to as "bag-in-the-box", allows to save packaging operations and avoids to transport packaging materials. The inner liners are made of a flexible material as for instance polyethylene or polypropylene.

When the solids are unloaded from a container equipped with an inner liner, measures have to be taken to preserve during the unloading the benefits brought by the inner liner. For instance, unloading by just tilting the container and pouring the solids on the floor is not acceptable in view of the possible contact of the solids with outside contaminants.

One known solution is to use inner liners provided with a coupling device, which itself is coupled to a closed pneumatic delivering system. The pneumatic delivering system unloads the solids directly in silos, where they are well contained and protected from possible contaminations coming from the environment.

However, when the solids are in the form of powders and in particular in the form of powders having a high angle of repose, it is often difficult to maintain a steady state flow rate to the pneumatic delivering system. Blocking often occurs, which requires the opening of parts of the coupling device or of the pneumatic tubing, thus reducing the advantages of the whole process.

In WO2009/130271 is described a method of unloading a powder from a container. In this method the lower part of the powder in the container is aerated by injecting gas in it. The aerated powder has a lower angle of repose and flows more easily in the discharge opening of the liner. The required tilting angle of the container during unloading is also reduced.

This known method, while efficient for unloading free flowing powders, appears insufficient for some powders, in particular those having a high angle of repose.

SUMMARY

The invention aims at providing a device for unloading from bulk containers powders having a tendency to block, the device allowing to maintain a steady flow rate in the downstream pneumatic delivery system.

Consequently, the invention concerns a device for unloading a powder from bulk containers equipped with an inner liner, the device comprising
- a collection unit suitable for being in tight fluid communication with the interior of the liner;
- a shearing unit, in fluid communication with the collection unit, comprising shearing means for shearing the powder; and
- a separate delivering unit, in down stream fluid communication with the shearing unit, the delivering unit comprising an output for pneumatic unloading means.

DETAILED DESCRIPTION

Figure 1:
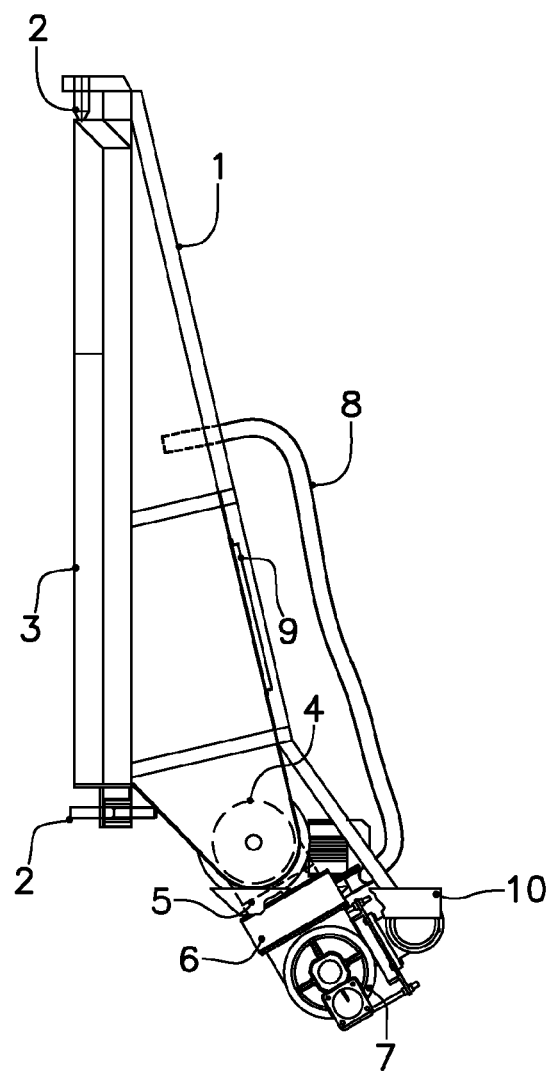
FIGS. 1 and 2 represent respectively side and front views of a device according to a particular embodiment of the invention.

In the device according to the invention, the collection unit allows the powder exiting from the liner to reach the shearing unit without being in contact with contamination from the environment. It is thus critical for the collection unit to be, in operation, in tight fluid communication with the interior of the liner.

When the inner liner has a coupling device exiting from the container, the collection unit can be tightly connected on this coupling device. Sealing means are often used to achieve the tight connection.

In a particular embodiment, recommended when the liner is not equipped with a coupling device, the collection unit comprises an access to the liner suitable to enlarge the fluid communication between the interior of the liner and the collection unit while the collection unit is in tight fluid communication with the interior of the liner. In this embodiment, the collection unit comprises generally a wide covering surface, suitable to cover a substantial part—generally at least 75%, often substantially 100%—of the back part of the liner. The back part of the liner is the part of the liner in the direction of which the powder flows when the container is tilted for unloading. Sealing means are often used to ensure the tight connection between the unloading device and the container. The access comprises in some instances a hatch designed in the covering surface. The surface of the hatch is generally at least 5%, often at least 10% of the surface of the back part of the liner. The access can comprise several hatches. When the hatch is open, it is possible for instance to cut the liner in order to open it on a wide surface, that is a surface representing at least 50% of the surface of the hatch. Then the hatch is closed in order to establish the tight and enlarged fluid communication of the collection unit with the interior of the liner.

In the device according to the invention, the shearing means of the shearing unit are the core of the device. Their function is to impart mechanical shear energy to the powder. Generally the device is designed such that in operation at least 50%, usually at least 75% of the unloaded powder receives mechanical shear energy from the shearing means. In this respect, it can be useful that the shearing unit comprises conveying means to convey the powder from the collection unit to the shearing unit. Such conveying means can comprise curved surfaces which direct the powder, during unloading, towards the shearing means. They can also comprise a screw conveyor. When the screw conveyor is rotating, it conveys the powder which falls into it towards the shearing means. The screw conveyor comprises usually two parts, a left hand part and a right hand part, situated on both sides of the shearing means, each part conveying the powder towards the shearing means. In a specific realisation, the flights of the screw conveyor comprise notches, suitable to impart a preliminary shear and mixing of the powder during its conveying.

Generally, nearly any solid body moving in the powder is able to transfer mechanical shear energy to it. The shearing means can comprise at least one rotating breaker bar. The word "breaker" here means that the dimensions and the rotation of the bar are suitable to generate the shear. An assembly of from 2 to 5 bars having a length/diameter ratio of at least 3 usually gives good results.

Conveniently, the shearing unit can integrate in one single element the rotating breaker bars, a left hand screw conveyor part and a right hand screw conveyor part, all mounted on the same rotating axis.

In a particular embodiment of the invention, the shearing unit comprises selection means, preferably a sieve, suitable to retain the powder in the shearing unit until it flows freely through the apertures of the selection means. The selection means are generally placed just downstream of the shearing means. When the device is operating, the powder which is retained remains in contact with the shearing means. When the powder is sufficiently free-flowing, it goes through the selection means and penetrates in the delivering unit. If the selection means comprise a sieve, the mesh size of the sieve can be adapted easily to the specificities of the powder and of the pneumatic unloading means. A finer mesh size will increase the residence time of the powder in the shearing unit and result in more shear energy imparted to the powder, which can be favourable if the pneumatic means require a powder with higher free flowing character. The equivalent diameters of the apertures of the sieve (square root of their surface) are generally comprised between 1 and 100 mm, often between 10 and 100 mm.

In the device according to the invention, the delivering unit comprises an output suitable for connecting pneumatic unloading means. The device is indeed well suited for operating with pneumatic unloading means. In such an embodiment of the invention, the delivering unit comprises an air lock upstream of the output for pneumatic unload means and downstream of the shearing unit. In this embodiment the powder exiting from the output of the delivering unit falls into a stream of air, usually generated by a compressor, circulating in a pipe. The inventors have observed that in this variant the air leakage coming from the pneumatic means and passing the air lock reaches the output of the shearing unit. The powder having just been subjected to shear is directly in contact with moving air, which maintains its free flowing character. This improves the overall efficiency of the device in operation. In a variant of the embodiment which has just been described, the delivering unit comprises a secondary valve upstream of the air lock, the secondary valve comprising means to recover leakage air exiting from the air lock. The recovered leakage air can be reintroduced in the liner, for example, since it is frequently laden with small particles of the powder, which are then recycled.

The collection, shearing and delivering units of the unloading device according to the invention are usually mechanically fixed to each other, the whole assembly comprising generally locks, for instance twist locks, suitable for fixing easily and quickly the device on the back of the container. The device is also usually equipped with forklift pockets allowing easy handling of the device.

The device according to the invention allows the unloading of powders even those having an angle of repose greater than 35°, generally greater than 40°, often greater than 45°, in some instance greater than 50°. The angle of repose is preferably measured according to norm ISO 4324 or using more modern measuring equipment. The particles of the powder can have a median particle size D50 smaller than 500 µm, generally smaller than 200 µm, often smaller than 50 µm, in some cases smaller than 25 µm. Examples of powders for which the device is well suited are: sodium carbonate and sodium bicarbonate, starch, soybean meal, and fish meal.

The device is also adapted to agglomerating powders, that is, powders which spontaneously, for example when exposed to humidity, form agglomerates of generally more than 100 particles, often more than 1000 particles. Such agglomerates which block conventional unloading devices of the prior art, are easily broken by the shearing unit. Such agglomerating powders can even be unloaded with the variant of the invention comprising pneumatic delivering means, due to the fact that the sheared powder can enter directly the pneumatic system, before the agglomerates could have a chance to form again.

The invention concerns also a process for unloading a powder from bulk containers equipped with an inner liner, according to which a device according the invention or according to any of the embodiments described above, is tightly fixed on the container, the powder is collected by the collection unit, then sheared in the shearing unit and delivered in a silo through the pneumatic output means of the delivering unit. In a further advantageous embodiment of the process according to the invention, the powder has an angle of repose greater than 35°, generally greater than 40°, often greater than 45°, in some instance greater than 50°.

In still a further advantageous embodiment of the process according to the invention, the powder is agglomerating, as defined hereabove.

The pneumatic transfer system used for unloading the containers is generally of the semi-dense phase type, which means: medium pressure and concentration with high speed of transfer.

It is made up of a transfer pipe and a compressor. Air-product separation takes place in the silo, which has its own dust filter. The transfer pipe should be as short as possible and inclined sections should be avoided in order to obtain a stable and acceptable flow rate. Depending on product concentration, speed of transfer and layout, the diameter of the transfer pipe is generally DN 80 to 125. The silo should be designed in order to obtain mass flow of the product and should be equipped for pneumatic loading, as for instance the suitable loading pipe and a dust filter, whose filtering surface is in accordance with the flow rate of the conveying air. In some cases it could be recommended to inject dry air at the top of the silo in order to eliminate any humidity present and to avoid the entry of humid air, especially during the product extraction phase via the dust filter. Any kind of water or humidity entering the silo must be avoided. In order to preserve the product in the silo, any kind of water or humidity entering the silo must be avoided.

Finally the invention concerns the free flowing powder unloaded by the process according to the invention. This powder, having been submitted to the shearing means, has indeed interesting free flowing properties.

EXAMPLE

Figure 2:
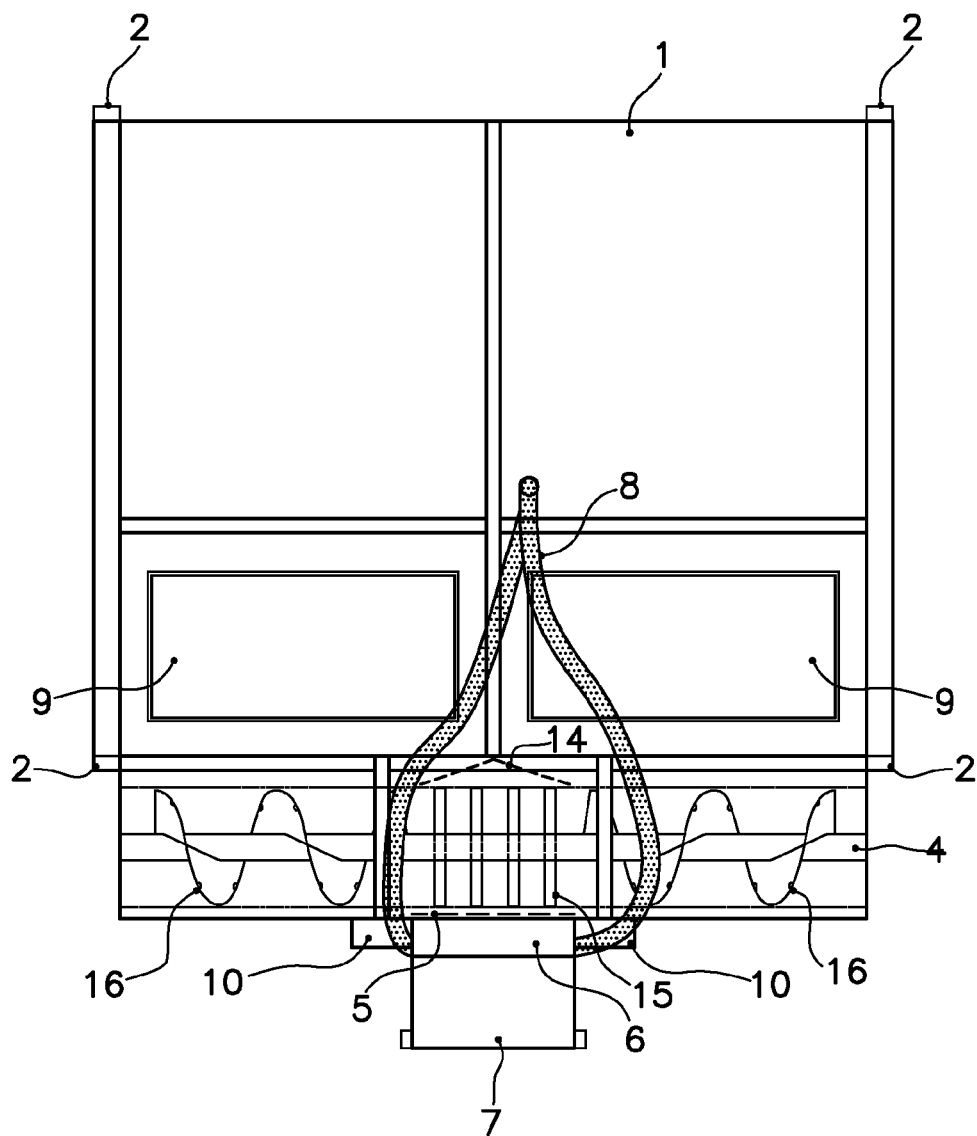
Figure 3:
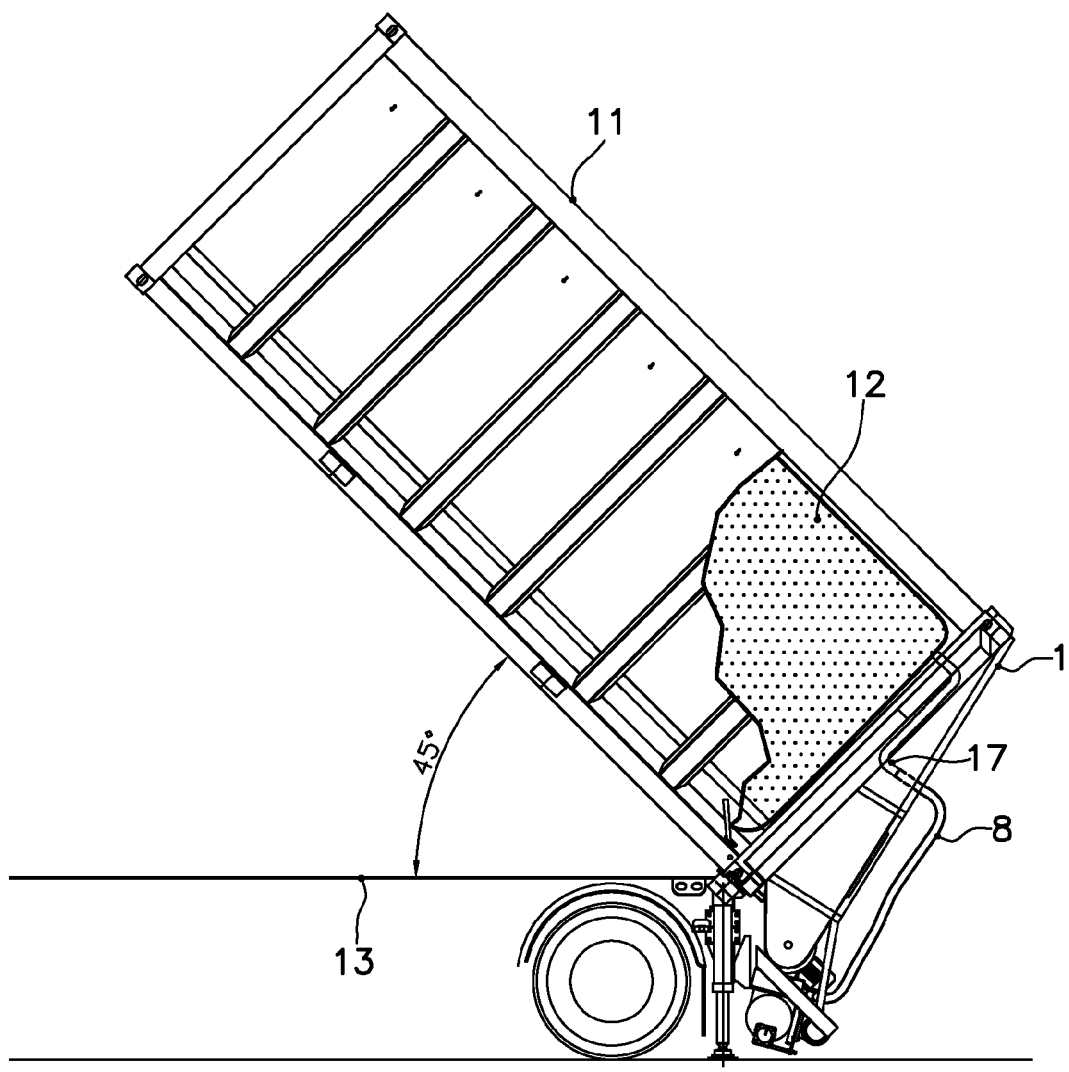
FIG. 3 represents the same device, fixed to a container which is transported on a truck.
Figure 4:
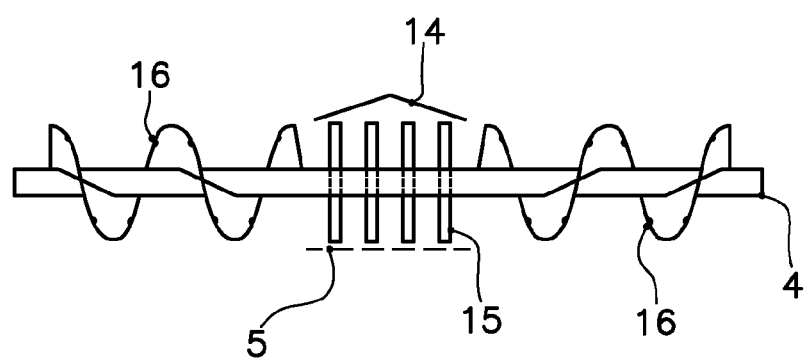
FIG. 4 illustrates a specific variant wherein a screw conveyor is mounted on the rotation axis of the shearing means.

The following example, making reference to FIGS. 1 to 4, illustrates a particular embodiment of the invention. In those figures, identical numerals refer to identical parts. FIGS. 1 and 2 represent respectively side and front views of a device according to a particular embodiment of the invention. FIG. 3 represents the same device, fixed to a container which is transported on a truck. FIG. 4 illustrates a specific variant wherein a screw conveyor is mounted on the rotation axis of the shearing means.

A container (11) equipped with an inner liner (12), loaded with sodium bicarbonate to be unloaded in silos, is placed on the tilting trailer of a truck (13). An unloading device according to a particular embodiment of the invention is tightly fixed on the back side of a container (11), by means of twist locks (2) and sealing means (3), to avoid spillage or product leakage. During its positioning and fixing, the device is carried by a lift whose fork is entered in built-in forklift pockets (10).

The device for unloading powder comprises:
- a collection unit (1) comprising two hatches (9) equipped with safety sensors prohibiting the functioning of the unloading device when the hatches are open;
- a shearing unit made of screw conveying means (4), shearing means (15) and a grid (5), the shearing means (15) consisting of breaker bars protected by a rigid baffle (14). The flights of the screw conveyor (4) comprises notches (16) and is driven by a variable speed drive; and
- a delivering unit made of a manual slide valve (6), allowing to regulate the overall unloading flow rate, and of a rotary valve (7). The manual slide valve is equipped with integrated leakage air collectors (8), which collect the leakage air from the rotary valve, loaded with sodium bicarbonate dust particles, and reintroduces it into the liner (12) through a flexible hose (17) in fluid communication with the interior of the liner (12). The rotary valve, driven by a variable speed drive, is equipped with quick couplings for the clean air hose from the compressor and for the connection to the loading pipe of the silo (both not represented).

Once the unloading device is tightly fixed, the hatches (9) are opened and a wide opening is cut into the liner (12). The hatches are then closed. Finally the manual slide valve (6) is open and the variable speed drives of the screw conveyor and of the rotary valve are adjusted to the proper flow rate in the pneumatic delivery system. The container is gradually tilted up to 45° by operating the tilting trailer (13). The sodium bicarbonate is unloaded in the silos.

The invention claimed is:

1. A device for unloading a powder from a bulk container equipped with an inner liner having an interior, comprising:
    a collection unit;
    a shearing unit, in fluid communication with said collection unit, comprising shearing means for shearing a powder, wherein said shearing unit comprises selection means to retain said powder in said shearing unit until said powder is free flowing; and
    a separate delivering unit, in down stream fluid communication with said shearing unit, said delivering unit comprising an output for connecting to pneumatic unloading means, and said delivering unit comprising an air lock upstream of said output and downstream of said shearing unit.

2. The device according to claim 1, wherein said collection unit comprises an access to said inner liner of said bulk container while said collection unit is tightly fixed on said bulk container.

3. The device according to claim 1, wherein said shearing unit comprises conveying means to convey said powder from said collection unit to said shearing unit.

4. The device according to claim 3, wherein said conveying means comprise a screw conveyor.

5. The device according to claim 4, wherein said screw conveyor comprises a left hand part and a right hand part placed on both sides of said shearing means.

6. The device according to claim 5, wherein said screw conveyor has flights which comprise notches to impart a preliminary shear and mixing of the powder during its conveying towards said shearing means.

7. The device according to claim 1, wherein said shearing means comprises at least one rotating breaker bar.

8. The device according to claim 7, wherein said shearing unit integrates, in a single element, said at least one rotating breaker bar, a left hand screw conveyor part and a right hand screw conveyor part, all of which are mounted on the same rotating axis.

9. The device according to claim 7, wherein said shearing means comprises an assembly of from 2 to 5 rotating breaker bars having a length/diameter ratio of at least 3.

10. The device according to claim 1, wherein said delivering unit comprises pneumatic unloading means downstream of said output.

11. The device according to claim 1, being tightly fixed on the bulk container by way of locks.

12. The device according to claim 11, wherein the locks are twist locks.

13. The device according to claim 1, wherein said selection means comprises a sieve.

14. A process for unloading a powder from a bulk container equipped with an inner liner, comprising tightly fixing the device according to claim 1 on said bulk container, wherein said powder is collected by said collection unit, then sheared in said shearing unit and delivered in a silo through pneumatic output means connected to the output of said delivering unit.

15. The process according to claim 14, wherein said powder is a sodium bicarbonate powder.

16. The process according to claim 14, wherein said powder has an angle of repose greater than 35°.

17. The process according to claim 14, wherein said powder is sodium carbonate, sodium bicarbonate, starch, soybean meal, or fish meal.

18. A device for unloading a powder from a bulk container equipped with an inner liner having an interior, comprising:
    a collection unit;
    a shearing unit, in fluid communication with said collection unit, comprising shearing means for shearing a powder; and
    a separate delivering unit, in down stream fluid communication with said shearing unit, said delivering unit comprising an output for connecting to pneumatic unloading means, and said delivering unit comprising an air lock upstream of said output and downstream of said shearing unit, wherein said delivering unit comprises a secondary valve upstream of said air lock, said secondary valve comprising means to recover leakage air exiting from said air lock.

19. A process for unloading a powder from a bulk container equipped with an inner liner, comprising tightly fixing the device according to claim 18 on said bulk container, wherein said powder is collected by said collection unit, then sheared in said shearing unit and delivered in a silo through pneumatic output means connected to the output of said delivering unit.

20. The process according to claim 19, wherein said powder is sodium carbonate, sodium bicarbonate, starch, soybean meal, or fish meal.

* * * * *